July 15, 1958  J. H. WALLY, JR., ET AL  2,843,010
POINT SOURCE LIGHT PROJECTOR
Filed March 26, 1956  4 Sheets-Sheet 1
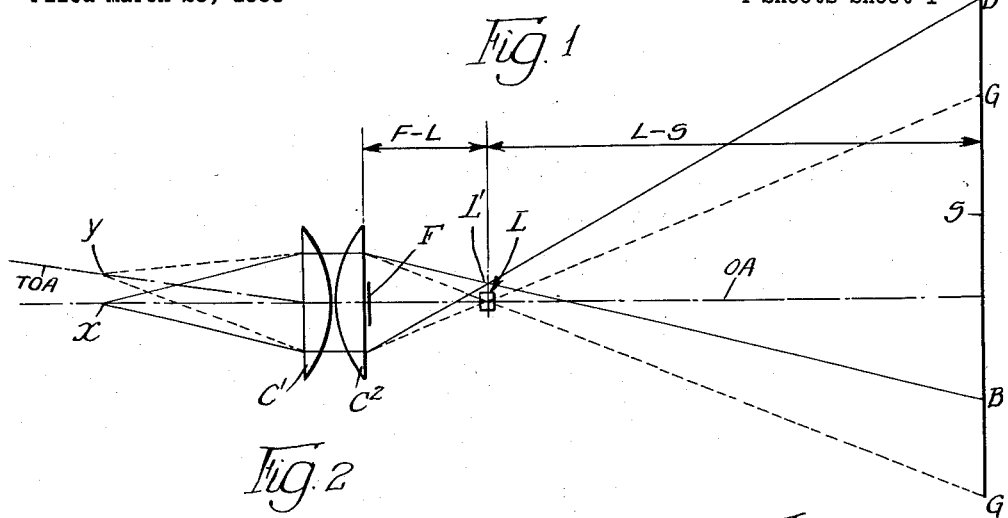
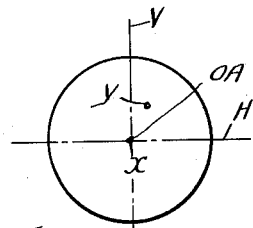
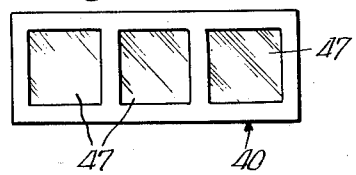
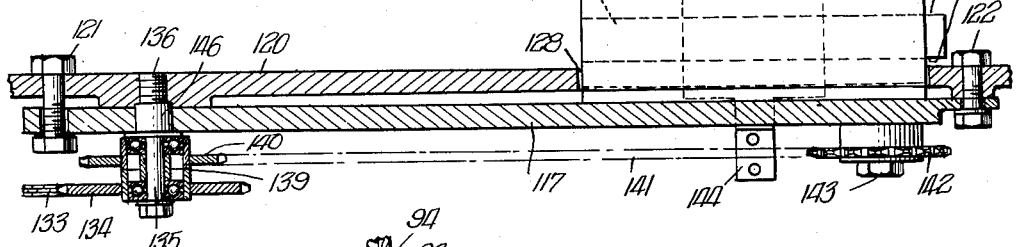
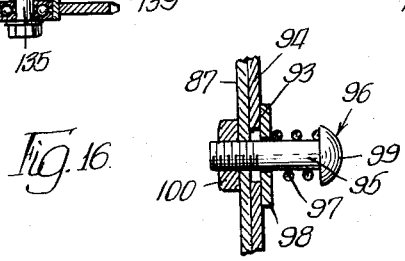
INVENTORS
Joseph H. Wally, Jr.,
BY Louis J. Grunwald,
Brown, Jackson, Boettcher & Dienner

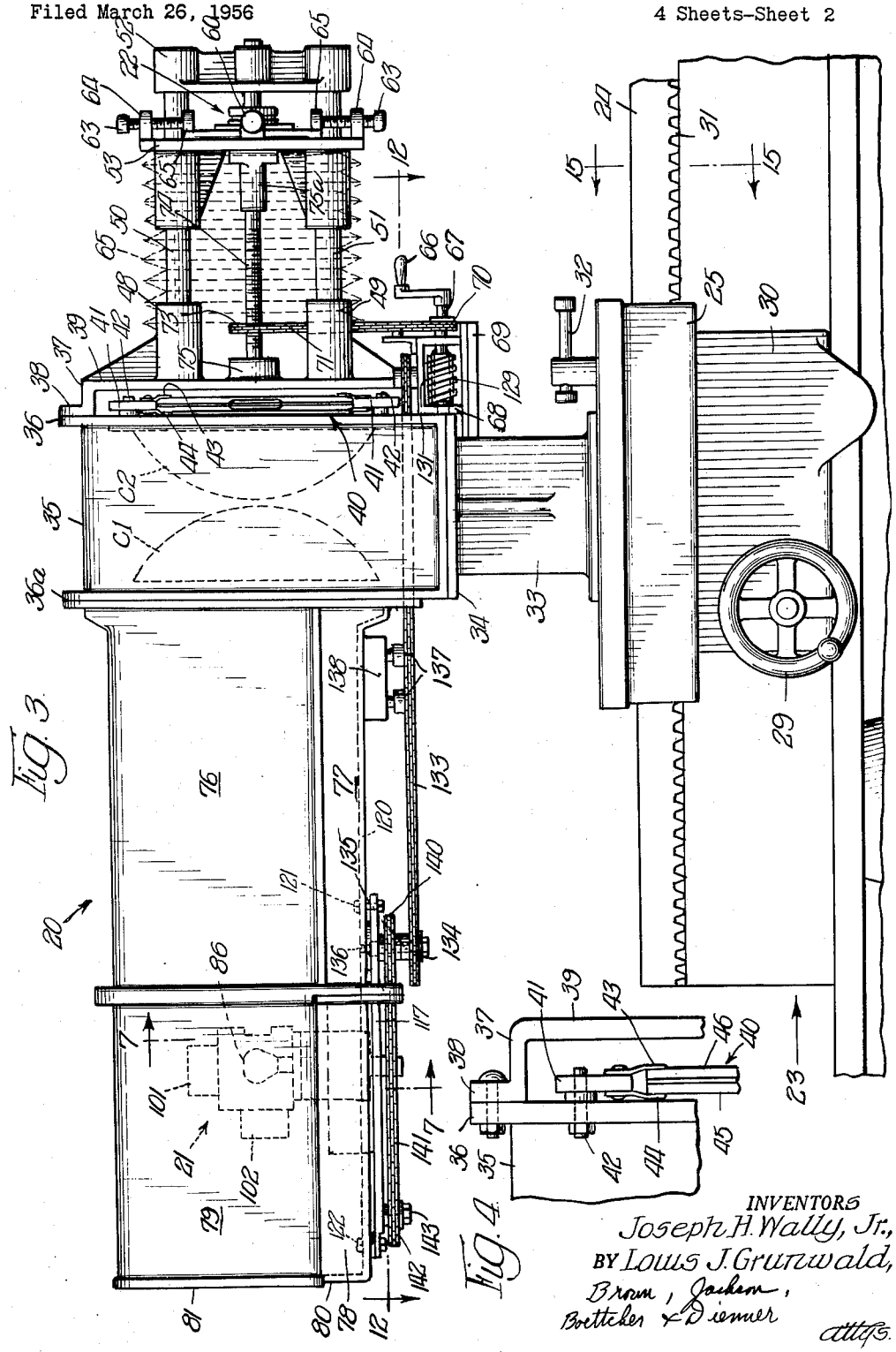

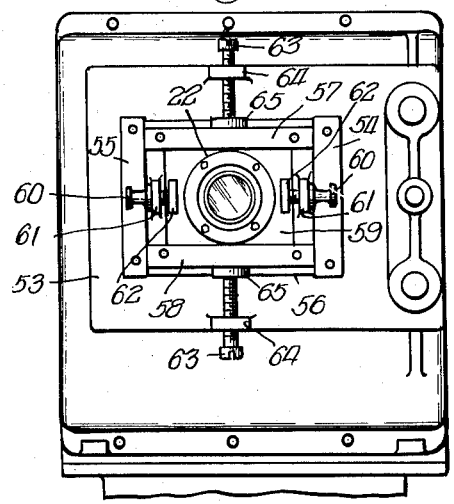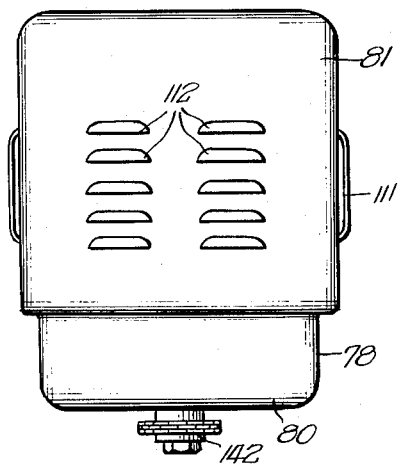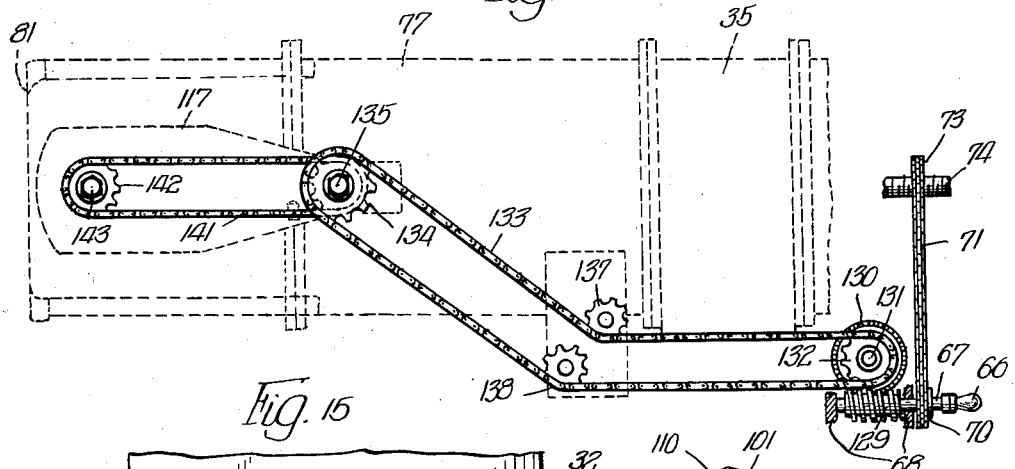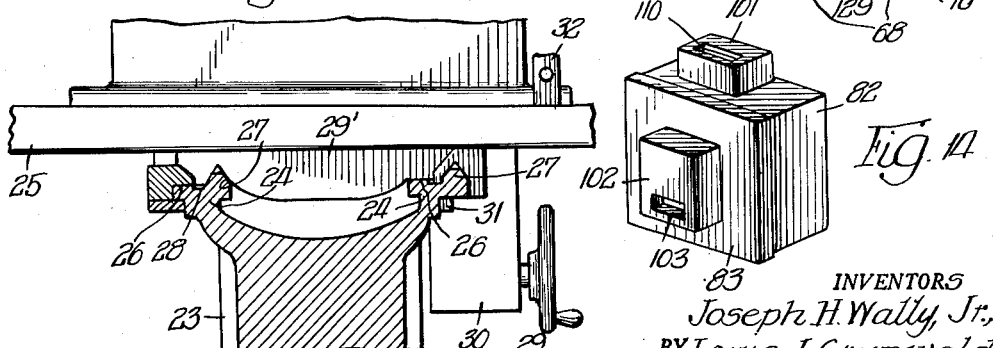
INVENTORS
Joseph H. Wally, Jr.,
BY Louis J. Grunwald,

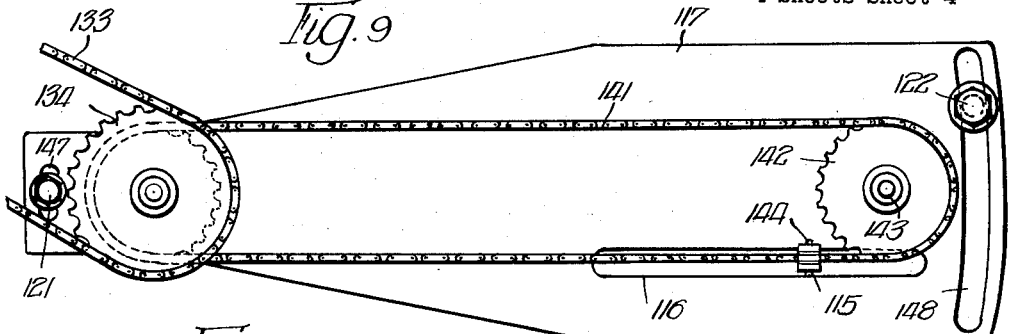
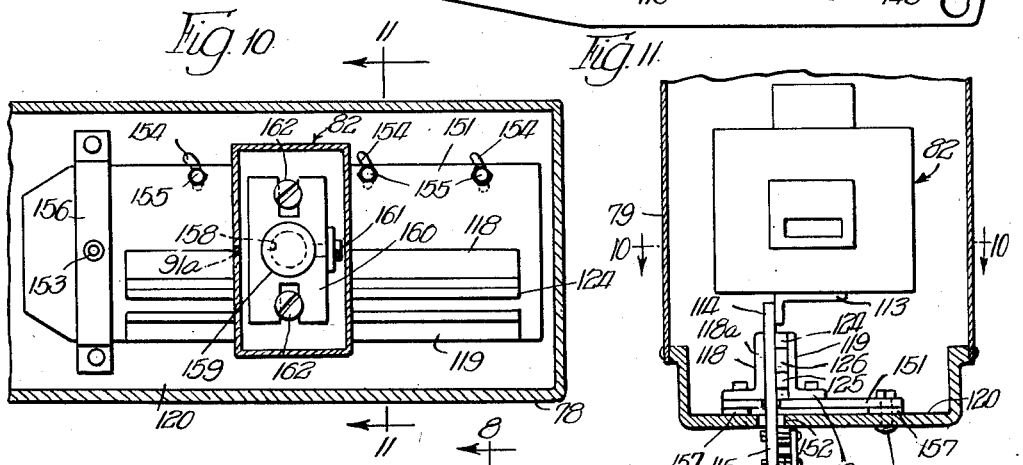

United States Patent Office 2,843,010
Patented July 15, 1958

2,843,010

POINT SOURCE LIGHT PROJECTOR

Joseph H. Wally, Jr., Mission Hills, and Louis J. Grunwald, Prairie Village, Kans., assignors to Micro-Master, Inc., Kansas City, Mo., a corporation of Missouri Application March 26, 1956, Serial No. 573,701

12 Claims. (Cl. 88—24)

This invention relates to projectors and the like used in photocopy work and more particularly to such devices which embody a point source of light.

Conventional projectors embody an arc-lamp or incandescent bulb of relatively high wattage for illuminating the film or other work to be copied together with a projection system embodying one or more lenses for focusing an enlarged image of said illuminated film onto a copyboard containing the sensitive paper or other material. Magnification of the image is ordinarily determined by the spacing of the copyboard from the projector and, as is well known, each change in magnification distance also requires a change in spacing of the projection lenses from the film support for proper focusing of the material being copied.

In order to obtain good imagery and sharpness of line contrast it has been found desirable to utilize one or more condensers between the arc-lamp and film being copied so as to converge the light rays at or near the nodal point of the projection lenses. A pair of plano-convex lenses arranged with their plane surfaces outside has been found to give best results. Ordinarily the film holder will be located as close to the forward side of the condensers as is practical so as to be well within the effective output of the condenser lenses.

The heat output of such powerful light sources is however very great and effective means needs to be found for insulating and/or cooling the same not only in order to provide comfort for the operator but also in order to protect the film being copied. Then with such a large amount of light there is the further problem of shielding or protecting the sensitive paper from said light so that a satisfactory print having sharpness of line contrast and detail, and without over-all fog, may be obtained when the paper is exposed to the projected light.

Furthermore, such projectors are burdened by the disadvantages of high maintenance and operating costs of such arc lamps or high wattage incandescent lamps. The carbons or bulbs need frequent replacement. They are disagreeable to work with and as projector lamps they are actually inferior for reproduction of line "copy." Such costs and disadvantages appear needless in view of the fact that a relatively large proportion of said costs are consumed in producing unused light and unwanted heat.

It is therefore a principal object of the present invention to provide a projector for such copywork which can be efficiently and effectively operated with bulbs of relatively low intensity and wattage as for example miniature lamp bulbs of low voltage which utilize a tiny filament housed in clear glass.

It is a further object of the invention to provide a projector which will give superior imagery and sharpness of line contrast while using a point source of illumination. It has been found, for example, that a very excellent and efficient point source of light can be provided in projectors by confining an ordinary miniature clear glass lamp bulb of (six, twelve, or otherwise) low voltage in an apertured housing if care is exercised to align the bulb's filament with the aperture and to locate the same along the optical axis of said projection system at a controlled distance rearwardly of the condenser. Under proper condition, it was found that sufficiently large amounts of light could be supplied to the condensers permitting a very short exposure time with excellent reproduction results.

Best results are obtained, it was found, if the point source of illumination is not only located on the optical axis of the system but is also so spaced from the back surface of the condenser lens elements that the condenser lens elements pick up said minute source of light and converge it on or near the nodal point of the objective lenses, otherwise there is a noticeable lack of sharpness in the projected image. This is particularly true in cases where the film being copied was about 4 x 6 inches in size, requiring condensers having diameters of 10 inches and larger. This means that for every change in magnification, not only must the spacing of the projection lenses from the front surface of the condenser lens elements be changed to obtain proper focusing of the image on the copyboard but also means that each change in focusing must be accompanied by a change in spacing of the point source of light from the condenser lens elements in order that the light rays continue to be converged by the condensers at or immediately in front of the nodal point of the projection lenses.

Preferably, a pair of condenser lens elements of plano-convex shape arranged with their convex surfaces back-to-back are utilized instead of a single condenser lens for greater improvement in contrast and sharpness in line reproduction. For example, projectors with only a ground or opal glass between the light source and the film will render a "soft" effect and so are of use only for continuous tone pictures such as portraits. However when two condensers are arranged as suggested above, in concert with both lens and a point source of light, the copy is so sharp and precise that it will show line copy with such sharpness and detail that projected prints have quality comparable to contact prints from line film. Thus good films are required but where such films are utilized, this ability to retain all detail proves very desirable. Of course, the condensers must also be of excellent quality, and as free as is practicable of internal stresses, bubbles, striations, etc. which cause distortion of the images.

The problem of producing such quality condenser lenses however becomes more and more acute as the size of the condenser increases and becomes particularly acute in photocopy work utilizing lenses having diameters in excess of nine or ten inches and upwards of fourteen inches. Although with care it is possible to get stria-free condensers, or condensers sufficiently stria-free for practical purposes, the individual condensers do not exactly duplicate each other as to optical paths. The problem is magnified when attempts are made to match two condensers. Although theoretically the optical axis of the light rays entering the rear surface of a pair of mated condenser lens elements should coincide with or be an extension of the optical axis of the exiting rays so that a line drawn through the center of the copyboard, projection lenses, film, condensers and light source would be a straight line, this has proved not to be the fact. Imperfections which are inherent to the condensers make this impossible. Moreover, it will be found that if the optical path has been determined for one relation of a pair of condensers and the condensers then individually rotated relative to each other, the optical path changes completely. This is true even though the convex side of the condensers is presumed to be a true spherical curve and properly aligned with its plane side. Although this phenomenon can not be completely explained it is believed that in the initial melting and cooling of the glass, internal stresses may be set up in the glass or it may be the lack of a homogeneous mixing of the glass components during mixing and cooling which so distorts the optical path of the light rays. In any event the problem is much in evidence in such large size lenses. Undoubtedly similar distortion is also present in condensers of much smaller diameter but in proportionately lesser amounts and consequently is not as serious a problem.

Thus it is the principal object of the present invention to provide means whereby the point source of light referred to above may be not only located on the "true" optical axis of the projection system but also that it may be made to closely follow said "true" optical axis of the condenser lens elements during adjustments of the light in response to axial adjustments of the projection lenses for proper focusing at varying magnification distance and in order to keep the point of convergence of said light rays on or near the nodal point of the projection lenses.

It is thus proposed and it is a further object of the invention to provide a predetermined path which the point source of illumination may be caused to follow during its adjustment relative to the condenser lens elements for different focal powers and which will compensate for the distortional effects of the condensers on the path of the light rays passing therethrough.

A further object of the invention is to provide a track like means on which the point source of illumination may be mounted for adjustment along such a predetermined path.

Still another object of the invention is to provide means by which such a track may be adjusted relative to the said condenser lens elements both vertically and horizontally.

A further object of the invention is to provide means whereby the axial adjustments of the point source of light may be made automatically in response to axial adjustments of the projection lens to obtain maximum quality by way of sharpness and contrast of line imagery for each change of focus.

Still another object of the invention is to provide a housing for a light bulb of low wattage as above described by means of which an effective and efficient point source of illumination for a projector may be produced.

Other objects of the invention include the designing of such a housing which will prevent light leakage and simultaneously allow means for removing the heat generated by the bulb or otherwise cooling the same.

Still another object of the invention is to provide a support for the lamp bulb which may be so adjusted as to locate the filament of the bulb at such height and position in the housing that it precisely follows the "true" optical path, a necessity since the position of filaments varies from bulb to bulb.

Still another object is to provide means whereby the aperture in said housing may be laterally adjusted so as to be brought into accurate alignment with the filament of the bulb and/or the "true" axis of the condensers.

It is thus proposed that not only may the lamp housing be adjustable vertically as well as horizontally in order to properly locate the point source of illumination on the "true" axis but it is further contemplated that the lamp bulb itself and also the aperture may be adjusted, either in the alternative or in combination, to bring the filament of said bulb into the required location on said "true optical axis," such as by movements in directions horizontally or vertically and at right angles to the optical path.

Many other objects as well as advantages of the invention will be at once apparent to those skilled in the particular art and it is to be understood that the description thereof that follows is not to be taken in a limiting sense but merely as being illustrative of how the invention may be carried out.

In the drawings:

Figure 1 diagrammatically illustrates the optical system of a projector according to the present invention;

Figure 2 is a view looking along the line OA of Figure 1 from the left side thereof and illustrates in somewhat exaggerated form how the "true axis" of the rays entering the condensers may be disposed off the geometrical axis of the projector both horizontally as well as vertically.

Figure 3 is a side elevational view, partly in fragment, of one form an embodiment of the invention may take;

Figure 4 is an enlarged fragmentary showing of the means for mounting the film holder on the projector housing;

Figure 5 is a view of the film holder;

Figure 6 is a fragmentary front end of the projector showing the lens board and adjacent associated parts of the projector;

Figure 7 is a sectional view taken along lines 7—7 in Figure 3 and looking in the direction indicated by the arrows;

Figure 8 is a sectional view taken along lines 8—8 in Figure 7;

Figure 9 is a view taken from the under side of the projector housing to show the light source supporting plate and associated gear and chain drive for automatically adjusting the light relative to the condensers;

Figure 10 shows an alternative arrangement for supporting the light source;

Figure 11 is a sectional view taken along lines 11—11 in Figure 10;

Figure 12 is a view of the drive mechanism for adjusting the position of the projector lenses and light housing relative to the condenser and is taken along lines 12—12 of Figure 3, related parts of the housing being shown in dotted lines;

Figure 13 is a rear end view of the projector housing;

Figure 14 is a rear perspective view of the light source housing and illustrating the relation of the ventilation means;

Figure 15 is a sectional view taken along lines 15—15 in Figure 3; and

Figure 16 is a sectional view taken along lines 16—16 in Figure 8.

Referring first to Figure 1 a projection system according to the present invention is diagrammatically illustrated as comprising a point source of light located at either X or Y, light therefrom shinning through the film F and being converged by condenser lenses C1 and C2 at the nodal point of projection lens system L or L' which in turn focuses said light rays, and thus an enlarged image of F, onto the screen or copyboard S containing the photo sensitive paper or emulsion. The film F is positioned as close as practical to the front of the forward condenser C2 in order that its corners will be well within the effective area of the condensers in order to keep spherical and other aberrations to a minimum. Where the size of the film being copied measures 4" x 6" most satisfactory results are found if condensers C1 and C2 are at least 9" in diameter. I prefer to mount the point source of light, condensers, film holder and projection lenses as a unit independent of the copyboard in order to permit proper location of the projection lenses along axis OA so that distance L—S may be set for a desired enlargement value and the distance F—L set to assure best focusing of an image on the copyboard at said distance although it would be possible to adjust S toward and away from L to accomplish the same result. As is well known when the distance between L and S is increased for greater magnification, the distance between F and L needs to be correspondingly reduced, although not usually in the same proportions, for proper focusing of the image. For example, although the distance between L and S may be increased by a constant value, equal to the focal length of L for each unit increase of magnification power, considerable more movement, relatively speaking, is required in adjusting distance L—F when going from 3X to 4X as compared with the movement required in going from 9X to 10X.

As previously mentioned, in using these large sized condensers I have also found it necessary to relocate the point source of light at a new distance from the condensers for each change in focus in order to prevent perceptible slacking off in quality of the projected image. In setting the projector for magnification changes from 3X to 10X which is the ordinary range of magnification values for photocopy work, it has been found that in one embodiment of the invention the movement of the light source in relation to the back surface of the rear condenser C2 will be roughly 3½ inches as compared to 2½ inches which the projection lenses need to travel to obtain proper focus for such magnification values. I have found it practical to combine the adjustments of the lenses L and light source and to accomplish this automatically by a chain and gear drive although, obviously, the amounts of movement of the light source for each unit change in magnification will be somewhat less than the change required in spacing F—L. However this can be easily controlled by proper relation of gear diameters, etc. It is also assisted by the fact that tolerances of roughly 3/16 inch from the ideal give satisfactory results.

One could easily assume that the point source of light should be adjusted along the geometrical axis OA of the system to an appropriate distance from the condensers C1 and C2 as indicated for example to point X. However, it has been found difficult and in most instances impossible or impractical to so arrange the condensers C1 and C2 relative to each other that the optical path of the light rays both entering condensers C1 and exiting from condenser C2 will lie on geometrical axis OA of the system and actually it has been found that if the point source is located at some point such as X along axis OA, the path of the light rays, as indicated in full lines in Figure 1, will on exiting from condenser C2 converge at a point off axis OA and to one side thereof as indicated by L'. Conceivably the projection lenses could be located at L' so as to project an image on the screen S in the area defined by limits B—B. There is however also the problem of image distortion which results from such an axial offset relation of the projection lenses. Moreover since it is important to relocate the point source of light with respect to condenser C1 for each change in magnification power, this means that position L' would not remain constant or even at the same distance off axis OA as X is moved along OA toward and away from condenser C1 but would follow an erratic path. Conceivably, it would be possible to determine the erratic path required. However, it would be complicated by different degrees of image distortion which would be introduced for each new position of the lense. Furthermore it is still necessary to adjust the light source. The problem can, therefore, be more satisfactorily resolved without the complication of distortion of image by relocating the point source of light to a new position Y such that the light rays therefrom, as indicated by dash lines in Figure 1, will converge at L and so obtain an image of F properly focused at S and in axial alignment with OA along which the projection lenses L are adjusted relative to S and F. As seen most graphically in Figure 2, it has been found that Y may be, and in most instances is, offset from axis OA in a vertical direction as well as a horizontal direction, V representing a vertical plane and H a horizontal plane with relation to axis OA. Through experimentation it has been found that the amount the point source of light must be offset from axis OA follows a path TOA which intersects the geometrical axis OA substantially at the rear surface of condenser C1.

In terms of physical dimensions, I have found that the amounts of deviation of the true optical axis TOA from the geometrical axis OA will actually be quite small. For example, in one projector provided with 8.75" focal length projection lenses, it was found that the light source travels in its adjustment from 3X to 10X magnification values approximately 3.375 inches. At the rear end of its path (10X magnification) it is usually no more than $\frac{1}{16}$ to $\frac{1}{8}$ inch higher, lower or laterally of the front of its path (3X magnification). The slope is thus not more than 1 to 27 and occasionally only half that. Nevertheless the differences are critical and it is important that the adjustment of the light source be confined to said axis TOA and it was found desirable to maintain tolerances within $\frac{1}{64}$ of an inch.

Therefore, in order to properly locate the light source, I propose to mount my light source on a track which is adjustable relative to the projector housing but which may be locked in position once an optimum relation to the axis OA has been determined experimentally as by moving the light source laterally, up and down and back and forth in conjunction with the required adjustments of the lens L. As a practical matter, it has been found sufficient if axis TOA intersects axis OA at some distance intermediate the light source and condenser C1 since one will appreciate that in the case of lower magnification values where the light source is closest to the condenser, the difference between OA and TOA is so small as to be hardly noticeable and within the $\frac{1}{64}$ inch acceptable tolerance. However as the light source is pushed further back from condenser C1 for greater magnification of F at S, the deviation of TOA from OA becomes much more significant.

As a further alternative, it would be possible in some instances to fix the lenses and light source in some erratic relation to axis OA and move the condensers forward and backward along OA to effect the proper focus for each change in magnification. However such a procedure would not only introduce the problems of where to best locate the light source and projectors to avoid the problems of distortion but there would also be the problem of devising means for accurately controlling the adjustment of the condensers. This would be complicated by the weight and size of the condensers which in the preferred 10 inch, 12 inch or 14 inch diameter sizes will together weigh from twenty-five to about fifty pounds. Conceivably it would also be possible to keep the point source of light on geometrical axis OA if the condenser elements were revolved one relative to the other. By changing and matching the elements experimentally, eventually relations could be found which would be nearly perfect for each of the several magnification values. However there are obvious complications and moreover it would still be necessary to adjust the point source of light. I, therefore, have found it much simpler and more practical and economical to determine TOA and adjust the point source of light therealong as I adjust the distance of the lens L from the film F to bring the image thereof into best focus on S for each L—S distance or enlargement value.

Now referring to Figures 3–16 wherein there is illustrated a preferred embodiment of the invention, 20 represents a projector generally embodying a light source 21, a pair of condensers C1 and C2 forwardly thereof and a projector lens system at 22. The condensers C1 and C2 each have an inner convex spherical surface disposed toward the other and an outer plano surface. The projector lens system at 22 may be any one of several conventional and available designs.

The projector 20 includes a base 23 on the upper side of which are disposed a pair of parallel spaced tracks 24 as seen best in Figure 15 along which slide member 25 may be adjusted to position the projection lenses 22 at the desired distance from the easel board (Figure 1) carrying the sensitive paper. As seen most clearly in Figure 15, tracks 24 each include a flat horizontal portion 26 and a further portion 27 having opposed convergingly related surfaces preferably separated by an intermediately disposed depressed area 28, slide member 25 being provided with complementary shaped portions 29' on its underside to slide on said surfaces 26 and 27. Any other shape of tracks and runners might be utilized which will give the desired result. Adjustment of slide member 25 along said tracks 24 is obtained by rotation of handle 29 which serves to operate a chain of gears (not shown) contained in depending portion 30 and which in turn mesh with gearing 31 on base 23. Locking means 32 is provided for locking the slide member 25 at a predetermined location along tracks 24 when the projector has thus been set at a required distance from the screen for a particular magnification power. Alternatively it would be possible to mount the projector 20 fixedly on its base 23 and move the screen toward and away from the projector so as to properly space the projection lenses 22 at the required distance L—S from the screen or easel board.

Extending upwardly from slide member 25 is upright 33 carrying base plate 34 on which condenser lenses C1 and C2 are mounted by conventional means not to be considered a part of this invention. The condenser lenses are enclosed by a U-shaped housing member 35 which is bolted or otherwise secured to the base plate 34 at opposite sides thereof. Said housing member 35 has flanges 36 and 36a at its front and rear sides by which the remaining portions of the projector are supported. To the forwardly disposed flange 36 of said housing 35 is bolted or otherwise secured a ring-like member 37 flanged as at 38 for securement to flange 36 and formed so as to leave a clearance area between said flange 36 and portion 39 of said member 37 in which the film holder 40 may be located. As seen in Figure 3 and more clearly in Figures 4 and 5, the film holder 40 preferably is supported in its required alignment and adjacent condenser C2 by means of a pair of horizontally extending bar members 41 which are secured to flange 36 by bolts 42 and each having resilient members 43 and 44 riveted thereto to form a pair of resilient channel-like means into which the opposite sides of the film holder 40 may be received. As seen most clearly in Figures 4 and 5 film holder 40 comprises a pair of plates 45 and 46 between which may be slidably disposed the films to be copied. In the preferred embodiment the plates 45 and 46 each have three aligned window-like openings 47 (Figure 5), whereby the film holder may be loaded with three films at one time and each successively exposed to light from 21. It is contemplated that the projector will be provided with condenser lenses having a diameter of at least nine inches and in which case the apertures 47 in the film holder 40 are preferably kept within a maximum size of at least 4 x 6 inches so as to be located well within the most effective and aberration-free portion of the condenser lens elements C1 and C2.

From one side of member 37 extend a pair of cylindrical bosses 48 and 49 in which are fixed one end of a pair of horizontally disposed guide rods 50 and 51. The opposed or outer ends of these guide rods 50 and 51 are supported by a connecting member 52. Said guide rods 50 and 51 are disposed in parallel relation with each other and also with tracks 24 so as to serve as means by which the projection lenses 22 carried by lens board supporting plate 53 may be guided in their required adjustment along axis OA for proper focusing of an image of the films supported in film holder 40. In order to properly locate the projection lenses 22 on axis OA and thereby in axial alignment with condenser lens elements C1 and C2, supporting plate 53 is, as seen in Figure 6, provided with a pair of vertically disposed members 54 and 55 channeled on their inner side to slidably receive an apertured plate 56. Plate 56 in turn carries a pair of horizontally disposed parallel related channelled members 57 and 58 on its front surface between which is slidably mounted apertured plate 59 which carries the projection lens system 22. Horizontal adjustments of the projection lens 22 are thus obtained by sliding plate 59 between members 57 and 58 and vertical adjustments by sliding plate 56 between members 54 and 55. Stop means in the form of thumb screws 60 threadedly mounted in bosses 61 carried by plate 56 and engaging abutment 62 serve to hold the plate 59 in desired adjusted relation with respect to plate 56 while stop means in the form of thumb screws 63 threadedly mounted in bosses 64 on plate 53 and engaging abutments 65 on plate 56 serve to limit and fix the vertical adjustment of plate 56 with relation to plate 53. Thus relatively simple means are provided by which the projection lenses 22 may be exactly located on axis OA. The path of the light rays from the film holder 40 to the projection lenses 22 is enclosed by bellows 65 secured at one end to member 39 and at its other end to plate 53 to prevent exit of extraneous light. The flexible character of bellows 65 accommodates adjustment of the lens housing 22 along axis OA for proper focusing of an image of the film in holder 40 on the sensitive emulsion at S. For this purpose a shaft 67 is journalled in bosses 68 on support 69 carried by upright portion 33 of the slide member 25 and is provided with gear 70 which is rotated by turning of crank 66 on shaft 67 to drive chain 71 which engages gear 73 to turn shaft 74 which is rotatably journalled at one end in means 75 on the member 39 and member 52 at its opposite end. Since shaft 74 is threadedly connected with cylindrical portion 75a on the lens board supporting plate 53, as shaft 74 is rotated by means of crank 66, the lens board 53 will be moved along guides 50 and 51, toward and away from the condenser lens elements C1 or C2. In this manner the projection lenses 22 carried by the lens board 53 may be adjusted along axis OA to the required distance of F—L for best focus of the image.

Bolted or otherwise secured to flange 36a on the condenser lens housing 35 is a further housing which is preferably made up of four parts so bolted or otherwise connected together that one or more of its parts may be individually removed to gain entrance into the interior of said housing. As thus illustrated in Figure 3, such further housing comprises members 76, 77, 78 and 79 of approximately U-shape section, housing portion 78 being closed as at 80 and the otherwise open end of housing portion 79 being closed by a removable wall 81. Within said further housing and toward the rear thereof is supported the light source indicated generally at 21 in Figure 3.

Referring more particularly to Figure 8 this source of illumination is seen as comprising a housing member 82 having a removable rear wall portion 83 and a floor portion 84 provided with a socket 85 to receive a lamp 86 of relatively small wattage and which may, for example, be an ordinary miniature clear glass lamp bulb of six, twelve or other low voltage. The forward wall 87 of said lamp housing 82 is provided with an opening 88 of circular shape (Figure 7) and which may be an inch in diameter or better to approximate at least the diameter of the cone of light from the lamp bulb filament 92 or point source of light. Preferably, also, there is supported over said opening 88, on the inside of wall 87, a flanged cup-like member 89. In the center of the cupped portion 90 thereof, there will be provided a substantially smaller aperture 91 and which may be from ⅜ to ½ inch in size and rectangular in shape to approximate in shape the windows 47 in film holder 40. However, it may be circular in shape if desired. Preferably the interior of the lamp housing 82 is painted a dull black, as are the other housing portions 35, 76, 77, 78, 79 and 81 and the aperture 91 is just large enough to permit the heart of the heated filament 92 to be visible to the condensers. One advantage of using the member 89 is that the rear wall of the cupped portion 90 may be disposed close to the walls of the bulb to minimize flare while permitting the most intense portion of light from said lamp 86 to pass through the aperture. However, if desired, said member 89 may be omitted.

Because the position of the filament 92 in the bulb envelope is not constant but varies from bulb to bulb it becomes important to provide means by which the aperture 91 may be aligned therewith for most effective illumination. One way this may be accomplished is by making the openings 93 (Figure 16) in the flange plate 94 of cupped member 89 somewhat larger in diameter than the diameter of the shafts 95 of the bolts 96 extending therethrough. This will permit a certain latitude of both lateral and vertical play or adjustment of the member 89 so that its aperture 91 may be properly aligned with the filament 92 in said bulb 86. A spiral spring 97 preferably encircles each shaft 95 and is held under compression between a washer 98 and the head 99 of the bolt 96 so that as nuts 100 are loosened sufficiently to permit a sliding adjustment of the plate 150 said spring 97 will act to hold member 89 in assembled relation with wall 87 at an adjusted position. Once a satisfactory alignment of aperture 91 and bulb filament 92 has been obtained, nuts 100 may be tightened to increase the compression of springs 97 and more positively hold member 89 in place on wall 87.

Ventilation of the interior of the lamp housing to prevent accumulation of the heat emitted by the lamp bulb 86 is accomplished by means of ventilators 101 and 102 on the top and rear walls thereof respectively. Ventilator 102 has its entrance 103 in the lower portion of its rear wall and in a substantial alignment with opening 104 into the interior of the lamp housing but separated by baffle 105 which causes cool air entering from 103 to follow the circuitous path indicated by the arrows 106 before entering the interior of the lamp housing proper through 104. Ventilator 101 is similarly fashioned so that the heated air, as it rises in the lamp housing exits through opening 107, must take the circuitous path indicated by arrows 108 about baffle 109 before exiting through exit 110. Thus the ventilators 101 and 102 are not only arranged to cause circulation of air through the lamp housing to prevent undue heating of the same but the arrangement also prevents the entrance or escape of light from the lamp housing other than through aperture 91. Suitable vents 111 and 112 (Figure 13) are also provided in the sides of housing portion 79 and rear wall 81 through which communication with the outside of the projector may be established for said entrance 103 and exit 110 in ventilators 101 and 102.

As previously discussed, it is an important feature of the present invention that means be provided whereby (1) the point source of light or lamp filament 92 may be located on the true optical axis TOA (which does not necessarily, and ordinarily does not, coincide with the geometrical axis represented by OA in Figure 1 with which the other elements of the projector are axially aligned) and (2) whereby the source of light also may be adjusted along said axis TOA in response to changes of location of the projection lenses on axis OA with relation to condensers C1 and C2, in order that the light rays from its heated filament will converge substantially at the nodal point of the projection lenses.

One means by which this may be accomplished is shown in Figures 7, 8 and 9. In this first embodiment of the invention, lamp housing 82 is secured to a substantially L-shaped supporting member 113 which in turn is bolted to a slide member 114. Said member 114 is provided with an end portion 115 which extends through a clearance opening 128 in the bottom wall 120 of housing portion 78 and into slot 116 of base plate member 117, the latter being secured to the underside of bottom wall 120 by bolts 121 and 122. Movement of portion 115 of slide member 114 is confined by a pair of angle members 118 and 119 which extend through the clearance opening 128 in bottom wall 120 and have their base portions 118a and 119a respectively secured by suitable means to the top surface of base plate 117 in substantially parallel relation with slot 116 as seen in Figure 7. The upright portion 118b of member 118 is provided with a substantially smooth inner surface to have sliding contact with one side of slide member 114. If desired a central section of said inner surface may be recessed along the length thereof as at 123 to reduce the area of contact. The upright portion of member 119 has a pair of spacer bars 124 and 125 bolted to the inner side thereof which spacer bars 124 and 125 also have substantially smooth parallel surfaces 124a and 125a, respectively, disposed in sliding contact with the opposed side of slide member 114. Surfaces 124a and 125a are spaced from the surface of upright portion 118b just sufficiently to allow sliding movement of member 114 therebetween. Slide member 114 is also provided with a guide bar 126 riveted to one side thereof which fits between spacer bars 124 and 125 and is provided with upper and lower parallel surfaces 126a and 126b which have intimate sliding fit with the adjacent machined surfaces of the upper and lower spacer bars 124 and 125. By the aforesaid means, the travel of the lamp housing 82 toward and away from the condensers may be confined within close tolerances.

It is a further feature of the invention that said longitudinal adjustment of the light source toward and away from the condensers is obtained simultaneously and automatically in response to the adjustment of the lens board 53 on guide rods 50 and 51 in order to locate the projector lenses contained in lens cell 22 at the best distance from the film holder 40 to focus an image of a film in said holder 40 on the copyboard. The means for accomplishing this is most clearly seen in Figures 3, 8 and 12 as embodying worm gear 129 disposed on shaft 67 so as to be rotated by the turning of crank handle 66. Worm gear 129 engages with gear 130 on shaft 131 at right angles to shaft 67. Also mounted on shaft 131 is a second gear 132 which drives roller chain 133 to operate gear 134. Said gear 134 rotates about shaft 135 which is extended through the base plate 117 and is threadedly connected as at 136 in bottom wall 120. Idler gears 137 mounted on extension 138 secured to the under side of housing portion 77 function to take up slack and cause chain 133 to miss housing 35 in which the condenser lenses C1 and C2 are contained (Figure 12). As seen in Figure 8, gear 134 is secured to gear 140 of smaller diameter by welding, as at 139, so as to rotate simultaneously therewith. Other means such as a pin through the two gears might be utilized to accomplish the same purpose. Rotation of gear 140 drives a continuous roller chain 141 extending about gear 140 and gear 142, the latter being rotatably mounted on the underside of base plate 117 by bolt means 143. Gear 142 is preferably of the same diameter as gear 140 and is secured to base plate 117 at a location such that a length of the roller chain 141 travels beneath the slot 116 along the length thereof.

As seen most clearly in Figures 7 and 8, portion 115 of the slide member 114 extending through slot 116 is connected with this section of the roller chain 141 by suitable means which, as seen in Figure 7, comprises a plate 144 secured to the depending portion 115 of the slide member 114 by a pair of bolts 145 with a section of the chain therebetween. The bolts 145 are spaced above and below the chain section and tightened sufficiently to clamp said chain section between plate 144 and depending portion 115.

Thus it will be seen that as handle 67 is turned to adjust the position of the lens board 53 toward and away from the film holder 40 through gear 70, chain 71, gear 73 and threaded connection of shaft 74 with the lens board 53, simultaneously motion will also be imparted to the lamp housing 82 through worm gear 129, gears 130, 132, chain 133, gears 134, 140, chain 141, portion 115 of slide member 114 and member 113 which carries the lamp housing 82. Since the distance through which the lens board is adjusted will be less than that through which the lamp housing 82 moves, the diameter of gear 140 is proportionally varied from that of gear 134 to achieve the required proportionate movements of the lamp housing and projection lenses.

As pointed out previously, with reference to Figures 1 and 2, it is important that the point source of light not only be adjustable toward and away from the condenser C1 in order to obtain the most effective use of the point source of light but it is also necessary that the point source of light be so located that its said movement be along the true optical axis TOA which ordinarily does not coincide with axis OA and will vary from one set of condensers to the next. Therefore means are provided in a projector according to the present invention by which the lamp housing 82 may be adjusted in directions both laterally and vertically with respect to the geometrical axis OA whereby aperture 91 may be maintained on axis TOA as the lamp housing is adjusted toward and away from the condensers by said movement of slide member 114 in slot 116. This is accomplished by mounting base plate 117 so that is may be swung about enlargement 146 of shaft 136 which is disposed normal to axis OA (see Figure 8). More accurately, base plate 117 would be arranged to swing about an axis intersecting the intersection of the rear surface of condenser C1 with axis OA. However since the variance of axis TOA from axis OA in lower magnifications is so slight, it has been found that satisfactory results can be obtained and in a much more practical and less complicated manner if base plate 117 is pivotally secured to swing about an axis intersecting axis OA at a point somewhat to the rear of the condenser lens C1. Securing bolts 121 and 122 extend through arcuate slots 147 and 148 provided in base plate 117 on opposite sides of the pivot connection 146 of plate 117 so as to accommodate, when loosened, said pivotal adjustments of plate 117. Tightening of bolts 121 and 122 serves to hold the plate 117 in its adjusted position.

If the aperture 91 in lamp housing 82 is either too high or too low with respect to axis TOA, it may be adjusted vertically by loosening bolts 149 which are used to secure angle member 113 to slide member 114. As seen in Figures 7 and 8, the openings 150 in member 114 through which said bolts extend are purposely elongated in a vertical direction to permit such vertical adjustment of the lamp housing in order to bring aperture 91 more nearly into coincidence with axis TOA.

Figures 10 and 11 illustrate an alternate means of mounting the lamp housing. In this arrangement the lamp housing 82 is mounted on angle member 113 and, as before, slide member 114 carrying member 113 is adapted to slide between spacer bars 124 and 125 on member 119 and the inner surface of upright portion 118b of member 118. However, in this alternative arrangement members 118 and 119 are secured to a base plate 151 which, although corresponding to base plate 117 of the first embodiment, is located inside housing 78 and is bolted to the top surface of its bottom wall 120. As before, portion 115 of slide member 114 extends through a slot in base plate 151 and is attached to chain 141, a clearance opening 152 being provided in bottom wall 120 to accommodate adjustment of portion 115. Base plate 151 is pivotally secured by means 153 to the bottom wall 120. As in the first embodiment, the adjustment of plate 151 is also about an axis disposed normal to an intersecting axis OA. As seen in Figure 10, bottom wall 120 is similarly provided with a plurality of arcuate slots 154 having their centers of curvature about pivot 153 for receiving bolts 155 which serve to secure the plate 151 to bottom wall 120 in its adjusted position relative to axis 153. A yoke 156 is also provided which extends over the forward end of the plate 151 and is bolted at its ends to the bottom wall 120 as a further means of positively locking the base plate 151 in its adjusted position. If desired, conceivably pivot 153 could be omitted and slots 154 curved about an axis which intersects the intersection of axis OA with the rear surface of condenser C1. In this modification, it is also proposed to provide shims 157 between bottom wall 120 and plate 151 so as to incline plate 151 at an angle such that the movement of aperture 91 of the lamp housing will more positively coincide with axis TOA.

Figure 10 also illustrates an alternative means of adjusting the relation of the bulb filament to the aperture in the lamp housing. Thus as seen in Figure 10 the lamp bulb is mounted in a socket 158 which is vertically adjustable in a receiving bore 159 provided in an H support 160. Thus the lamp bulb socket 158 may be raised or lowered until the filament is at a correct height relative to aperature 91A and at which time set screw 161 may be tightened to hold the socket at said adjusted height. By loosening screws 162, the H support 160 may be adjusted laterally to locate the filament in the horizontal plane with respect to the aperture R1A. It is of course within the scope of the invention that either the adjustable H support or the adjustable cupped portion 89 as seen in Figure 8 may be used alone in the lamp housing or both in combination.

Many other changes and/or modifications will also at once be apparent to those skilled in the art as coming within the scope of the invention as defined in the appended claims. For example, it is conceivable that other means than a system of chain drive and gears might be utilized for obtaining the adjustments of the lens board and light source with relation to the condensers. For example, a system of pivotally connected levers might serve as well. Furthermore, it might be sufficient under some circumstances to rely entirely on adjusting the height of the lamp bulb 86 in its socket 159 to center its filament 92 on axis TOA without having to shim plate 151 as in the modification according to Figures 10 and 11 or to adjust the connection of angle member 113 on slide member 114 as in the embodiment according to Figure 8. Conceivably under some circumstances it might be desirable, or found necessary, to so adjust the paths of movement of the light source and the lens board that the light rays as converged by the condensers will intersect axis OA in front of the projection lenses rather than exactly at their nodal point. For example, when working with films of larger than the prescribed size, it may be necessary to work out a compromise between cutting the corners of the film to be copied and sharpness of its image. Ideally however, the nodal point of lenses is the best point for convergence of the light rays by the condensers and variations in the setting of the light source, condensers and projection lenses from this ideal are accompanied by a proportionate loss of sharpness in the image projected to the copy board.

It thus will be apparent that all of the objects and advantages of the invention have been demonstrated as obtainable in a convenient, simple and practicable manner.

Having described our invention, we claim:

1. A projector comprising, in combination, a point source of illumination, an object holder, projection means for focusing an image onto a screen of an object supported by said holder in axial alignment therewith, condensing means between said source of illumination and object holder for converging light rays from said source through the object to said projection means, means for axially adjusting said projection means in accordance with the extent of magnification of the object desired, and means for moving the said source of illumination in a path toward and away from the condensing means in accordance with the axial adjustment of said projection means, together with means for controlling said path whereby the light rays from said source and passing through the condensing means will converge at said projection means.

2. A projector comprising, in combination, a source of illumination, an object holder, projection means for focusing an image onto a screen of an object supported by said holder in axial alignment therewith, condensing means between said source of illumination and object holder for converging light rays from said source through the object to said projection means, means for axially adjusting said projection means in accordance with the extent of magnification of the object desired, means for moving the said source of illumination in a path toward and away from the condensing means in accordance with the axial adjustment of said projection means, means for controlling said path whereby the light rays from said source and passing through the condensing means will converge at said projection means, and interconnection means whereby the adjustment of said source of illumination will be responsive to axial adjustments of said projection means.

3. A projector comprising, in combination, a source of illumination, an object holder, projection means for focusing an image onto a screen of an object supported by said holder in axial alignment therewith, condensing means between said source of illumination and object holder for converging light rays from said source through the object to said projection means, means for axially adjusting said projection means in accordance with the extent of magnification of the object desired, and means for moving the said source of illumination in a path toward and away from the condensing means in accordance with the axial adjustment of said projection means, and means for controlling said path whereby the light rays from said source and passing through the condensing means will converge at said projection means, said controlling means permitting the path through which the source of illumination is adjusted in response to axial adjustments of said projector means to be laterally displaceable in both vertical and horizontal directions.

4. A device comprising, in combination, a point source of light, a pair of condensers positioned to converge light rays from said point source to a point of convergence, an object holder forwardly of said condensers for holding an object in the path of convergence of said light rays, projection means axially aligned with said condensers for receiving said converged light rays and projecting them onto a screen to form an image thereon of an object held by said object holder, together with means for axially adjusting said projection means relative to the object holder in accordance with the extent of magnification of its projected image desired, and means responding to the axial adjustment of said projection means for varying the spacing of said point source of light from the condensers whereby the projection means will be positioned at the point of convergence of the light by said condensers for its different positions of axial adjustment.

5. A projector as defined in claim 4 including support means along which said point source of light moves toward and away from the condensers to vary the spacing therebetween, together with means for laterally adjusting said support means to control the direction of said movement of the point source of light.

6. A projector as defined in claim 5 further including means for raising and lowering the height of said point source of light relative to the mentioned support means along which it moves.

7. A projector as defined in claim 4 further including a track along which the point source of light moves and means for effectively pivoting said track about a pair of axes angularly disposed to each other and to the direction along which the point source of light moves on said track to control the direction of said movement of the point source of light.

8. A projector as defined in claim 4 wherein the point source of light includes a housing having an aperture therein, a support along which said housing is adapted to move toward and away from the condensers, means for laterally adjusting the support and further means for lowering and raising said housing relative to the support whereby the direction in which the housing moves relative to the condensers may be controlled.

9. A projector as defined in claim 8 wherein the housing has an apertured plate thereon to form the point source of light and means whereby said apertured plate may be adjusted in different directions within a plane.

10. A projector as defined in claim 8 further including a lamp support in said housing, and means whereby said support may be adjusted to permit location of the filament of a bulb supported thereby in substantial alignment with the aperture in said housing.

11. A projector as defined in claim 4 further including a track along which the point source of light may be moved toward and away from the condensers, means by which the path of said point source of light moves along said track may be adjusted, together with driving means interconnecting said point source of light with the projection means whereby said point source of light will be moved predetermined amounts along a controlled path in response to the axial adjustments of said projection means.

12. In a projector embodying an object holder and focusing means for projecting an image of an object supported by said holder, a lamp housing comprising a filament bulb support in the base thereof, an open area in the forward wall portion of said housing, a plate portion over said open area, and including an apertured cup, means carried by one of said portions including a shaft extending through an opening in the other portion which opening has a diameter greater than that of the shaft thereby permitting lateral adjustment of said plate portion to center the aperture therein with the filament in a bulb which is mounted on said support in the base of the housing, together with resilient means taking up slack between said portions and to hold said apertured plate portion in its adjusted relation on said wall portion of the housing.

References Cited in the file of this patent

UNITED STATES PATENTS

| | | |
|---|---|---|
| 1,174,479 | Darby | Mar. 7, 1916 |
| 1,257,128 | Sheck | Feb. 19, 1918 |
| 1,338,818 | Dennington | May 4, 1920 |
| 1,408,875 | Foley | Mar. 7, 1922 |
| 1,496,427 | Nelson | June 3, 1924 |
| 1,528,506 | Opacki | Mar. 3, 1925 |
| 1,654,391 | Thornton | Dec. 27, 1927 |
| 1,720,011 | Stark | July 9, 1929 |
| 1,750,910 | Stark | Mar. 18, 1930 |
| 1,863,099 | Bowen | June 14, 1932 |
| 1,887,650 | Larner et al. | Nov. 15, 1932 |
| 2,077,111 | Kent | Apr. 13, 1937 |
| 2,239,760 | Simon | Apr. 29, 1941 |
| 2,448,568 | Zwillinger et al. | Sept. 7, 1948 |
| 2,460,841 | Morey et al. | Feb. 8, 1949 |
| 2,664,781 | Waller | Jan. 5, 1954 |